May 29, 1951 A. H. BUCKLEY 2,554,853
SELECTION METHOD AND APPARATUS
Filed April 18, 1947 8 Sheets-Sheet 1
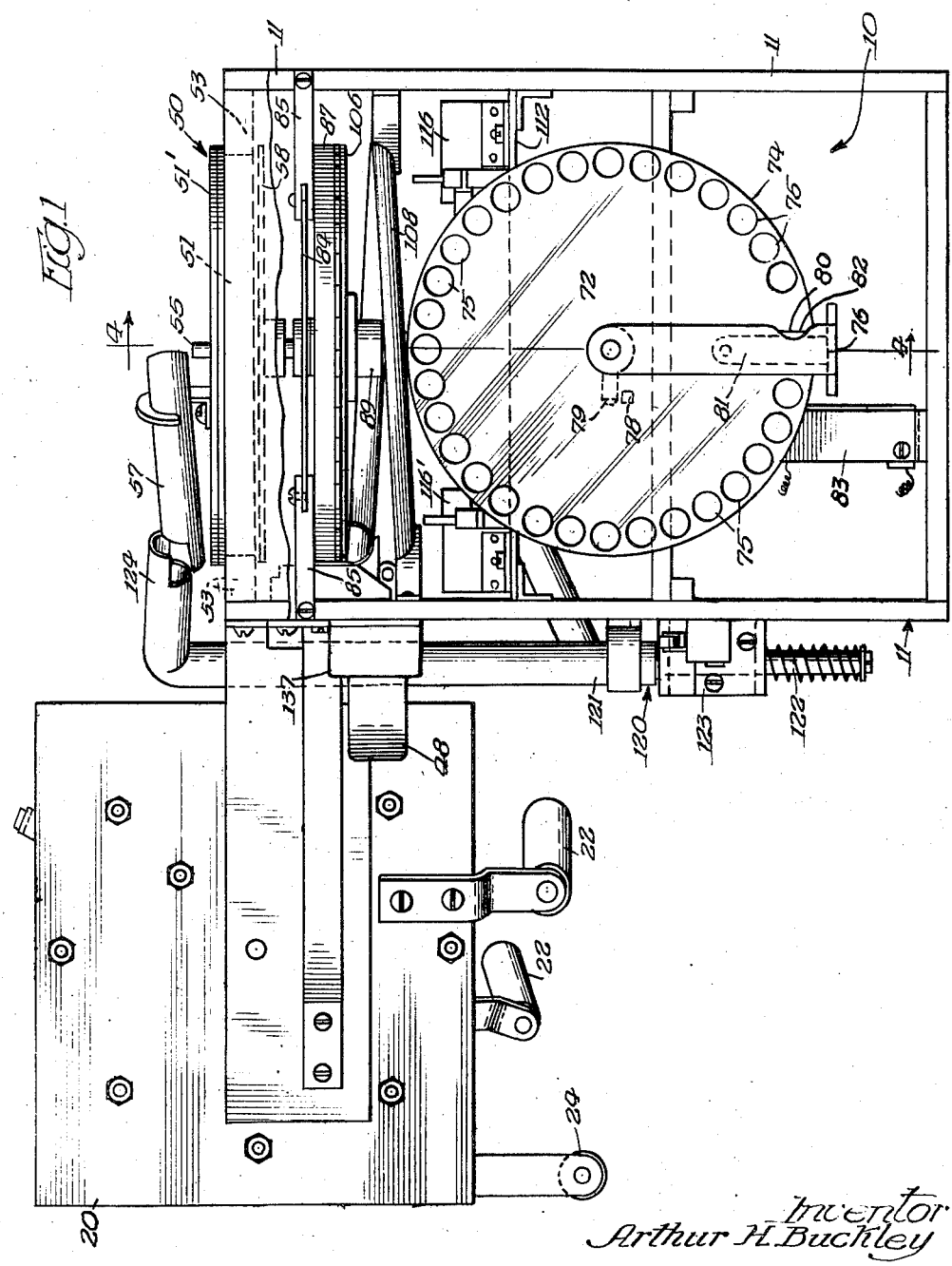
Inventor
Arthur H. Buckley
By Spencer, Marzall, Johnston & Cook.
Atty.

May 29, 1951  A. H. BUCKLEY  2,554,853
SELECTION METHOD AND APPARATUS
Filed April 18, 1947  8 Sheets-Sheet 2
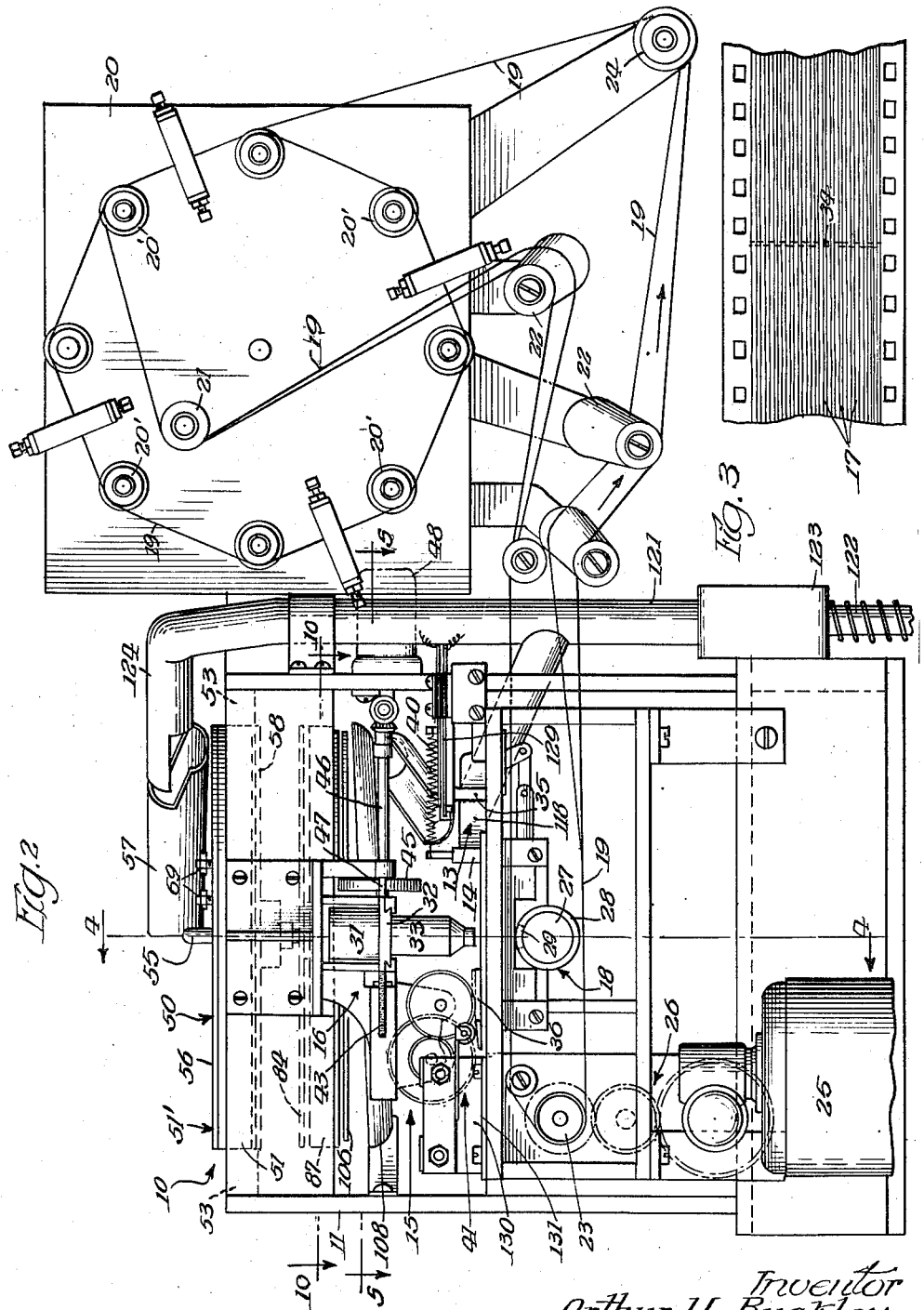
Inventor
Arthur H. Buckley
By: Spencer, Marzall, Johnston & Cook
Attys

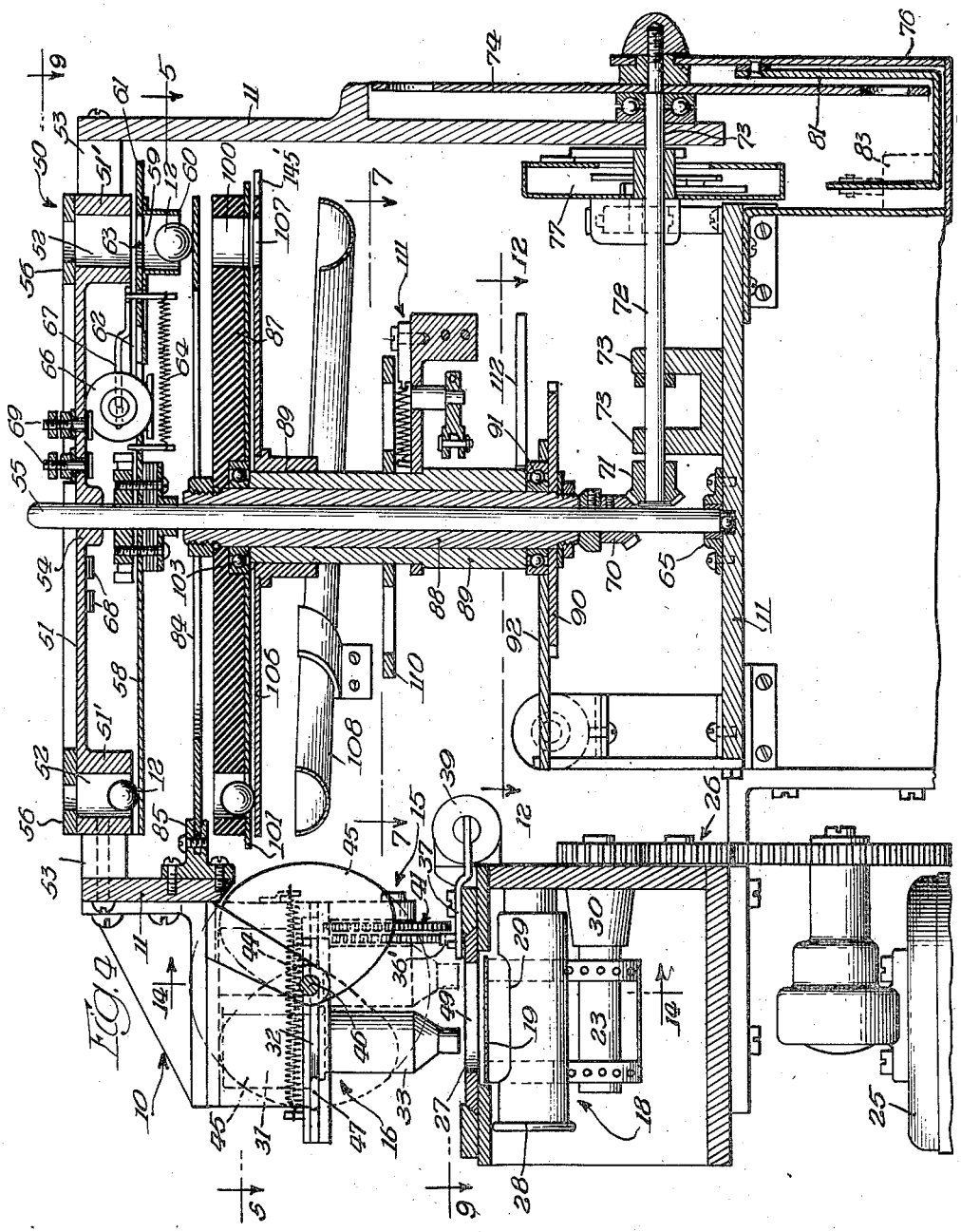

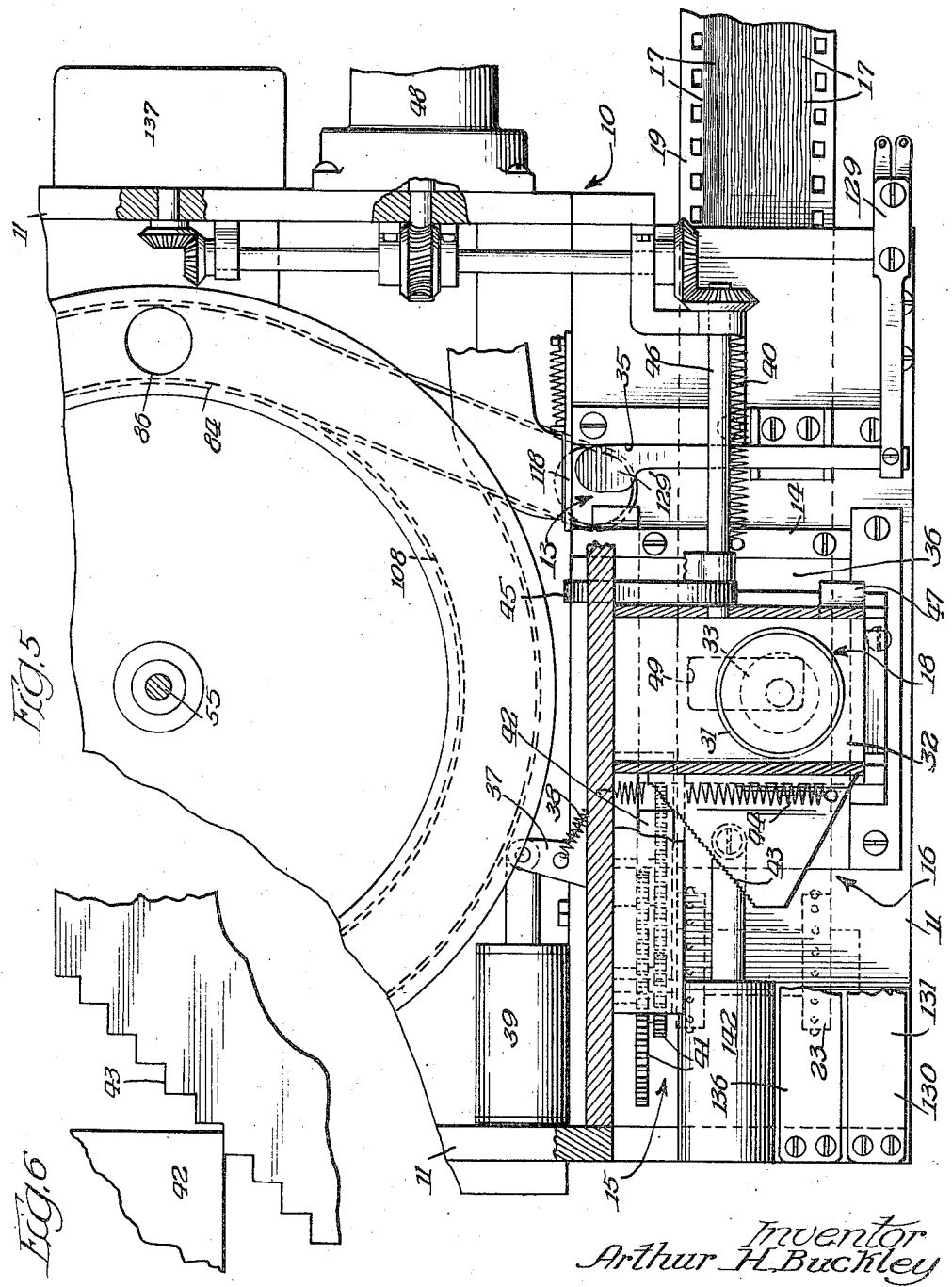

May 29, 1951 A. H. BUCKLEY 2,554,853
SELECTION METHOD AND APPARATUS
Filed April 18, 1947 8 Sheets-Sheet 5
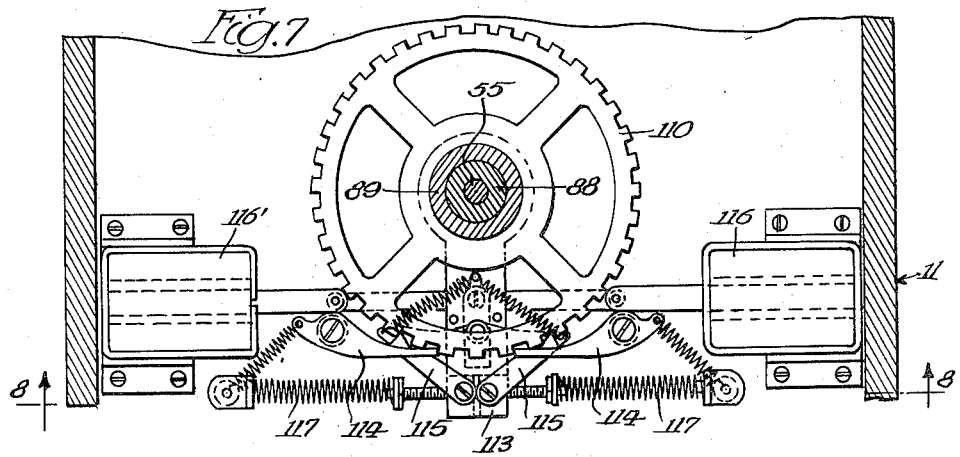
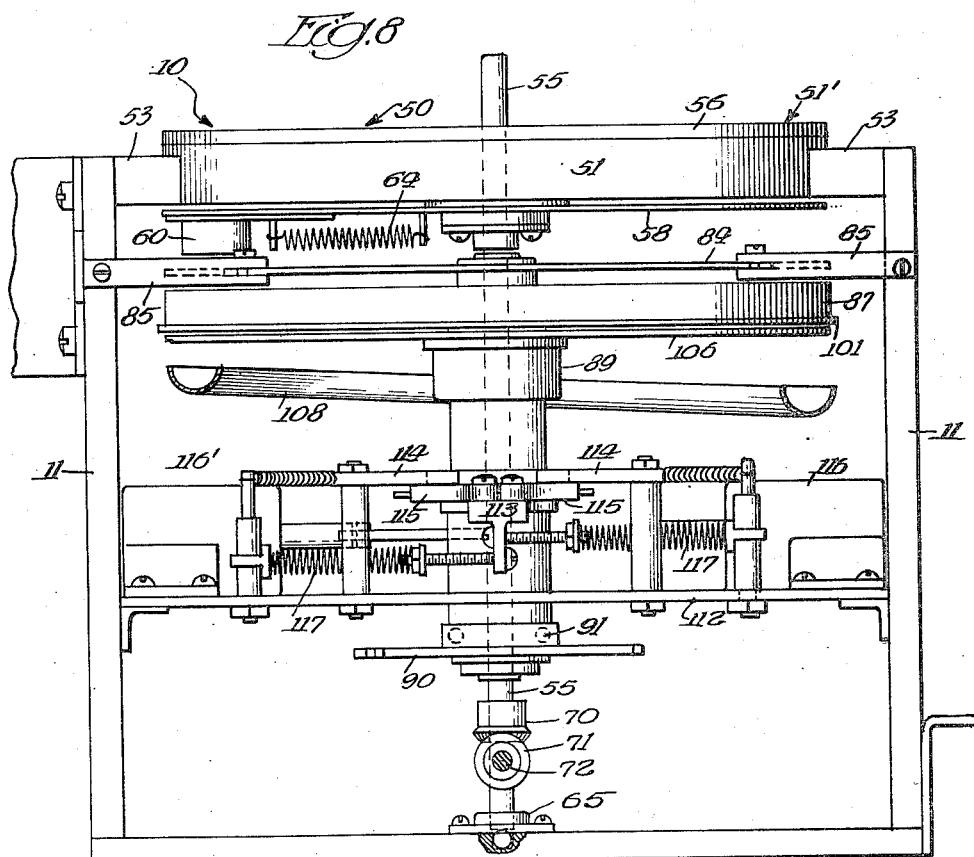
Inventor
Arthur H. Buckley
By: Spencer, Marzall, Johnston & Cook
Attys.

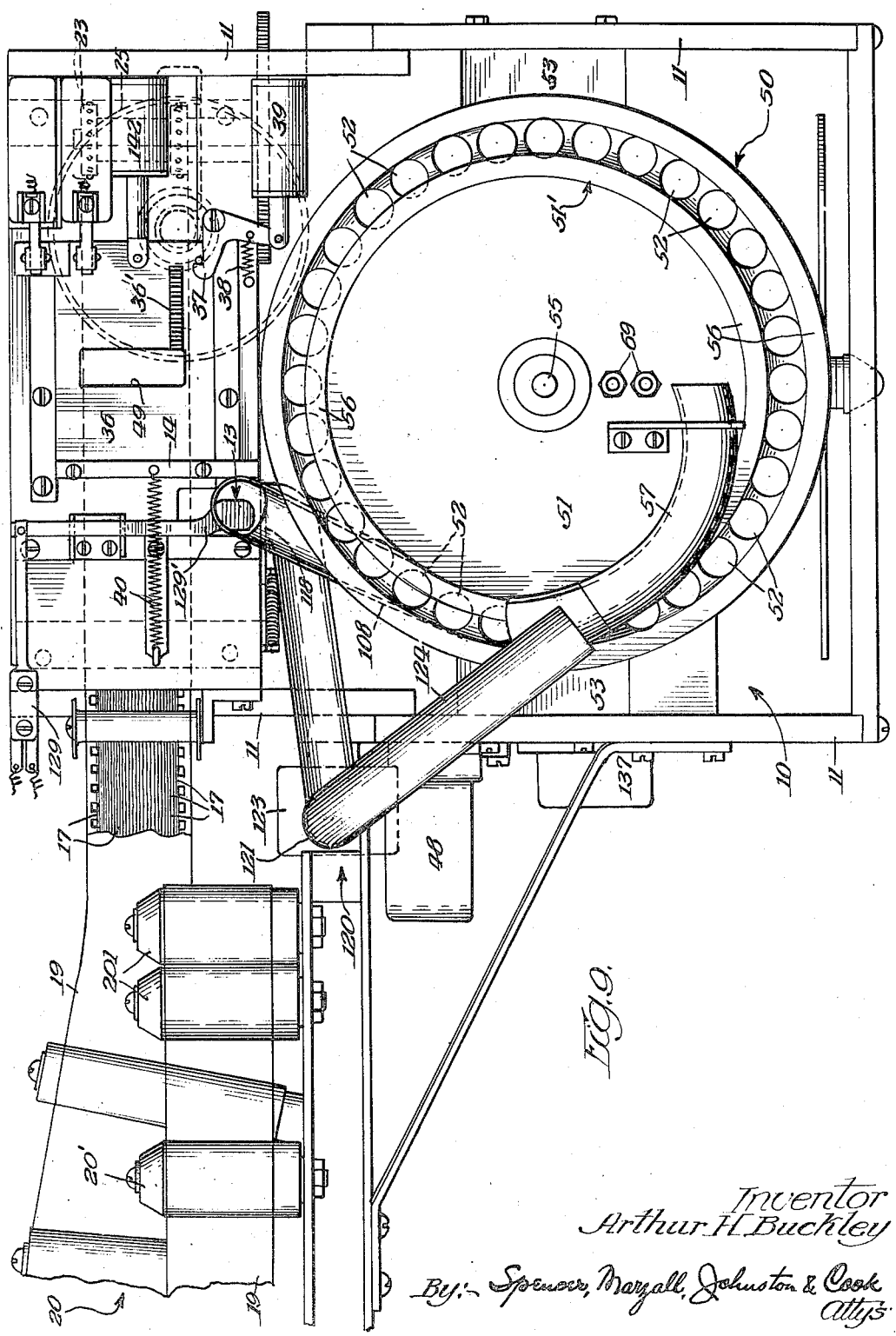

May 29, 1951 A. H. BUCKLEY 2,554,853
SELECTION METHOD AND APPARATUS
Filed April 18, 1947 8 Sheets-Sheet 7
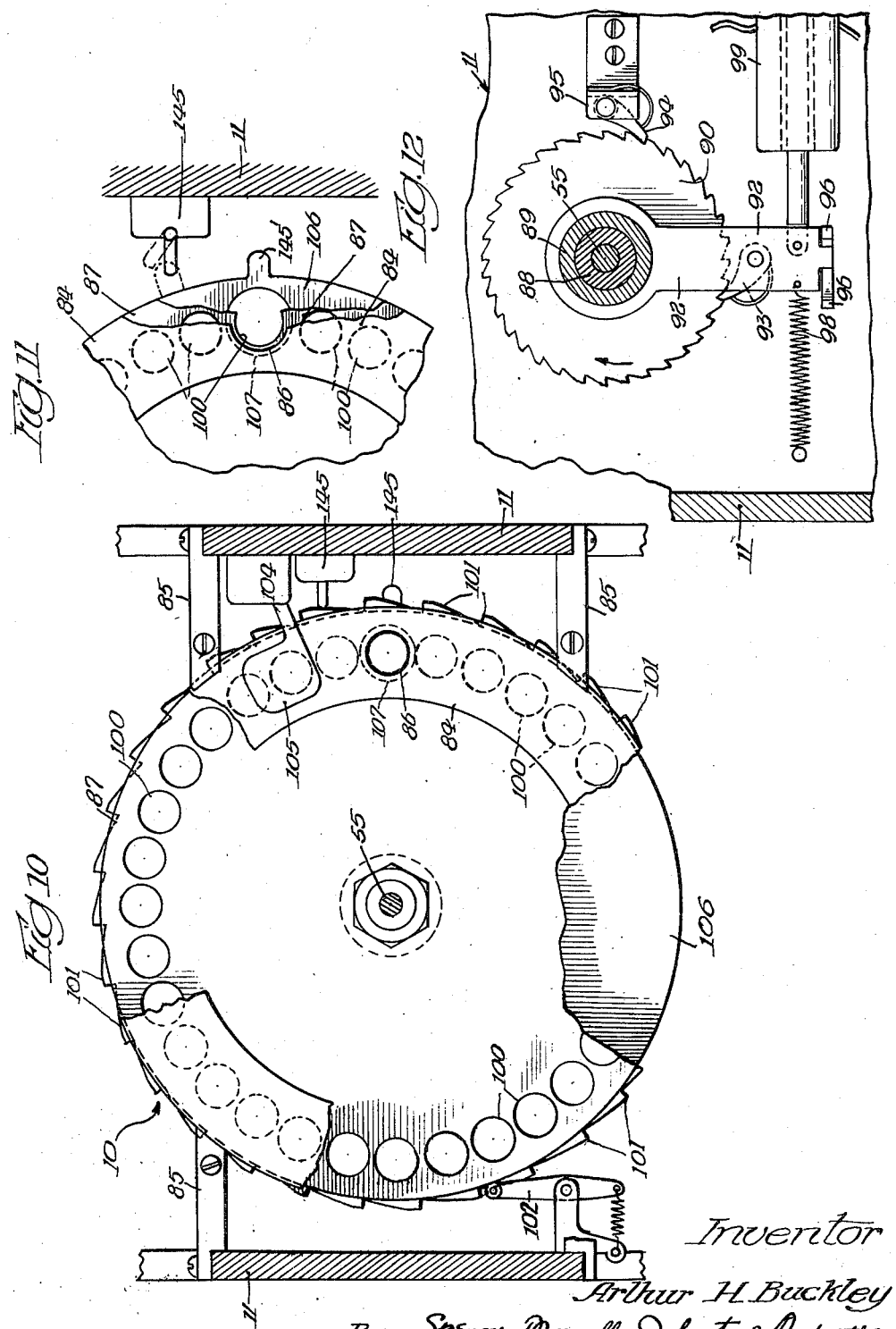
Inventor
Arthur H. Buckley
By: Spencer, Marzall, Johnston & Cook Attys Patented May 29, 1951

2,554,853

UNITED STATES PATENT OFFICE 2,554,853

SELECTION METHOD AND APPARATUS

Arthur H. Buckley, Chicago, Ill., assignor to George Gorton Machine Company, Racine, Wis., a corporation of Wisconsin Application April 18, 1947, Serial No. 742,394

11 Claims. (Cl. 274—10)

The present invention relates in general to novel means for and method of selecting articles, objects or devices from among a number of the same; the invention having more particular reference to the selection of devices in any desired or selected sequence; and the invention more especially relates to apparatus for selecting sound records for reproduction, and causing reproduction of the selected records in a selected sequence, although it will be obvious that the invention may be applied for the selection and operation of other than sound reproducing devices.

An important object of the present invention is to provide for selecting objects, articles or devices, in any desired, sequential order; a further object being to provide for selecting operable devices for operation in a desired or selected sequence.

Another important object is to provide means for selecting any desired number of objects or devices from among a plurality of the same, and to present the selected objects or devices in any selected sequence; a further object being to so select sound records, or other operable devices, and to present the so selected records or devices for reproduction or actuation in a selected sequence.

Another important object is to provide selector mechanism of the character mentioned, and adapted to function in response to the manual operation of a selector dial, whereby the mechanism may be actuated for selective purposes, in a desired sequence, by successive operation of the dial in accordance with the desired selection sequence.

Another object is to provide means whereby, after a selection has been selected, in a selection sequence, the dial thereafter can not be operated to select said previously selected selection in the same selection sequence.

Another object is to utilize gauge elements of unlike dimension as selection means in selecting apparatus of the character mentioned; a further object being to utilize gauge elements comprising balls of unlike diameter.

Another object is to provide mechanism for selecting gauge elements of unlike size in any desired selection sequence, and for presenting the selected gauge elements, in selected sequence, at a selecting station, including gauge means at said station for measuring the gauge element, and means actuated by said gauging means for selecting a device or article, corresponding to the gauge element being measured, from among a number of such articles or devices.

Another important object is to provide for storing gauge elements, such as balls, of unlike size, as in a magazine, ejecting said gauge elements from the storage magazine, and presenting them successively, in a selected sequence, to a gauging device adapted to successively perform selection operations in accordance with the size of gauge elements presented to the gauging device, and means operable to return the gauging elements from the gauging device to the storage magazine.

Another important object is to provide a plurality of operable devices, such as sound records, and operating apparatus for actuating said operable devices selectively, as by selectively reproducing sound records, and selector means comprising gauge elements, such as balls of unlike size, and means to present the gauge elements in selected sequence at a gauging station, to thereby actuate the operating apparatus for the actuation of said devices in a sequence corresponding with the sequence of presentment of the gauge elements at the gauging station; a further object being to provide for the exclusion of each gauge element from the gauging station until the completion of the operating cycle of the operable device actuated as a result of the presentment of the preceding gauge element at said gauging station.

Among other objects of the invention is to provide compact mechanism occupying minimum space for accomplishing the selection and operation of devices in any desired sequence, the selector mechanism of the present invention comprising a relatively small number of operating parts as compared with the selecting flexibility afforded.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a front view of selector mechanism embodying the present invention;

Fig. 2 is a back view of the mechanism shown in Fig. 1;

Fig. 3 is an enlarged view of a record member adapted to be used in the apparatus;

Fig. 4 is a sectional view taken substantially along the line 4—4 in Figs. 1 and 2;

Figure 13:
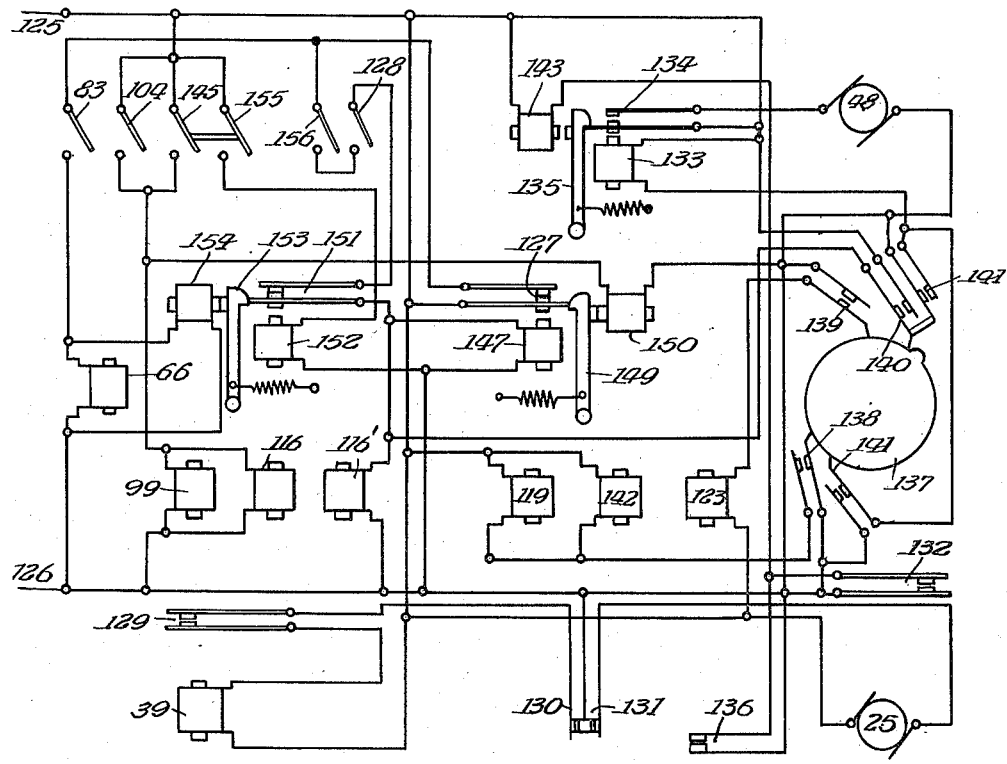
Figure 14:
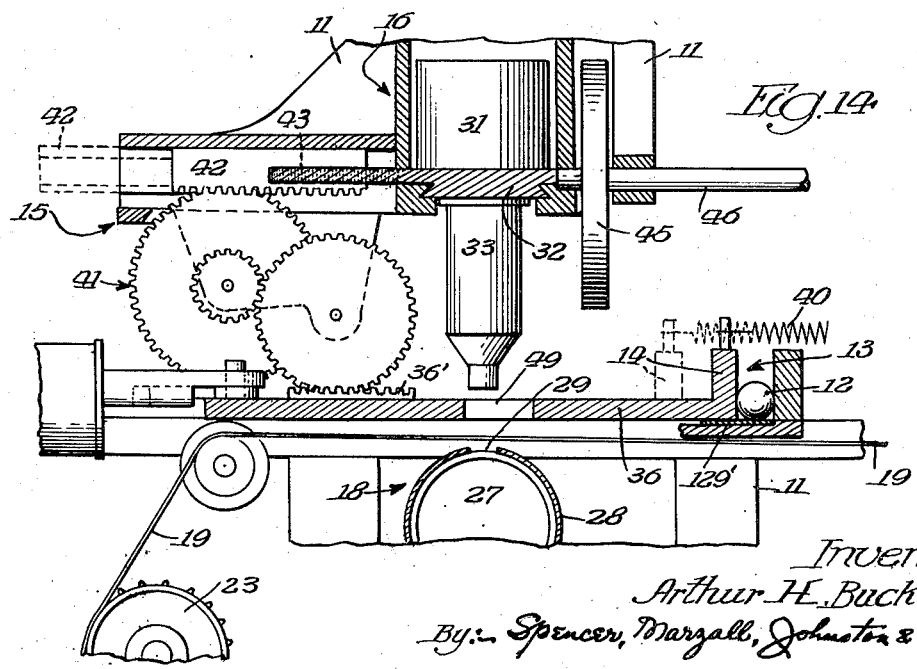

Figs. 5, 7, 9, 10, 12 and 14 are sectional views taken substantially along the lines 5—5, 7—7, 9—9, 10—10, 12—12, and 14—14 in Figs. 2 and 4;

Fig. 6 is an enlarged fragmentary view of a portion of the apparatus shown in Fig. 5;

Fig. 8 is a sectional view taken substantially along the line 8—8 in Fig. 7;

Fig. 11 is a fragmentary view of portions of the apparatus shown in Fig. 10; and Fig. 13 is a diagram of electrical circuits.

To illustrate the invention, the drawings show selector mechanism 10 mounted on frame means 11 and adapted to present gauge elements 12 of unlike size successively at a gauging station 13, wherein the gauge elements are successively measured by gauging apparatus, including a movable block 14 on the frame 11 which occupies different relatively shifted positions corresponding to the sizes of the gauge elements successively presented for measurement at the gauging station. The movable gauge block 14 is drivingly connected with operable means 15, on the frame 11, for selecting, from time to time, from among a number of selection devices, the device which corresponds with the gauge element being measured at the gauging station.

The apparatus of the present invention is adaptable for application to any selecting purpose regardless of the character or nature of objects or devices to be selected. In this connection, the apparatus is applicable to the selection, for example, of electrical operating circuits, mechanical selection devices, and, in fact, to perform any desired kind of selection adapted to be accomplished in response to the displaced position of the gauge block 14. The apparatus however, is particularly suitable for use in the selection of sound records, and, to this end, the drawings show the gauge block 14 operatively associated, through the operable means 15, to actuate sound record selecting mechanism 16. While the drawings show selectable sound records 17 of the sort formed on translucent tape or film, and adapted for reproduction by light sensitive pick-up means 18, it is obvious that the operable means 15 may be applied to control the selection of sound records of the sort formed as a sound groove adapted for reproduction through mechanical pick-up means. In this connection the gauge block 14 through suitable operating means, corresponding with the means 15, may be employed to control the operation of electrical circuits for actuating record selecting and reproducing mechanism adapted to accommodate sound groove records of the disk type.

As shown in the drawings, however, the selectable sound records 17 are formed in adjacent, side by side relationship on a translucent film 19, which preferably comprises an endless strip suitably stored on a rack 20, which may conveniently be supported on the frame 11 and having circularly arranged, spaced apart storage rollers 20' upon which the major portion of the endless strip may be stored in successive coils. The coils of the strip may travel on the rollers 20', and the innermost coil may be drawn from the rollers around a guide roller 21 and the strip passed thence around delivery rollers 22 to the pick-up means 18. The strip may be drawn through the pick-up means by a driving sprocket 23 and returned thence, as around a guide roller 24, to the outer coil of the record strip portions carried on the rollers 20'. The strip traversing sprocket 23 may be driven at predetermined speed by any suitable driving means, such as an electric motor 25 mounted on the frame 11 and drivingly connected with the sprocket 23, as through reduction gearing 26.

The pick-up device 18, as shown in the illustrated embodiment, may comprise an elongated photoelectric cell 27 of the sort having a longitudinally extending sensitive plate adapted to alter the electrical characteristics thereof in response to light impingement on the plate. This cell 27 may be electrically connected with any suitable or preferred sound reproducing equipment in order to reproduce sound in response to the variation of light impingement on the plate of the cell. The cell 27 is preferably mounted within a light-tight casing or housing 28, which may conveniently have a cylindrical configuration to receive the elongated cell 27 therein, the housing 28 having an elongated lateral slot 29 opposite the light sensitive element of the cell. The cell in its housing may be supported on the frame 11, as by suitable bracket means 30 carrying the cell and its housing in position to extend transversely of, adjacent, and on one side of the film strip 19 as the same passes the pick-up means 18, the slot 29 and the sensitive element of the film being parallel with respect to the film strip and spaced slightly therefrom, so that each transverse portion of the film strip passes across and in front of a corresponding active portion of the sensitive element of the cell.

The pick-up means 18 may also include an exciter lamp assembly 31, suitably mounted in a carrying frame 32 for movement on the frame 11 in a direction transversely of the film strip. The exciter lamp assembly comprises a light emitting lens 33 disposed adjacent the side of the strip 19 opposite from the slot 29 of the cell housing, the emitting lens 33 being movable in spaced relation and parallel with respect to the slot 29, so that a beam of light from said source may pass through the film strip and the opening 29 and impinge upon the light sensitive element of the cell 27, as the film strip is moved between the light source 33 and the cell. The light source or lens assembly 33 is also preferably masked to provide a light beam 34 of limited width corresponding with the width of a sound track on the strip, so that by adjusting the position of the light source transversely of the record strip 19, as it passes across the cell 27, the light beam of limited width may be caused to pass through only that portion of the record strip containing a single sound track thereon, light being prevented from passing through adjacent tracks on the record strip. Accordingly, by selectively positioning the light source, transversely of the record strip 19, the beam may be applied through any selected one of a plurality of sound tracks on the strip, to thus select a desired sound record track for reproduction by sound reproducing apparatus operatively connected and associated with the cell 27.

The selective reproduction of record tracks on the strip 19 is thus accomplished, in the illustrated embodiment, by adjusting the lateral position of the light source 33 with respect to the record strip in accordance with the position of the gauge block 14, which, in turn, is determined by the size of the gauge element 12 at the gauging station 13, such selection being accomplished by the operable means 15. To this end, in the illustrated embodiment, the gauging station 13 comprises a stationary shoulder 35 formed on the frame 11 and forming a pocket for receiving a gauge element 12 in position against the shoulder 35. The gauge block 14 comprises a bar on a slide 36, which slide is movable in a slideway on the frame 11 to move the gauge block 14 toward and away from the shoulder 35. The slide 36 is normally held in retracted position, as by means of a latch 37, with the gauge block 14 spaced away from the shoulder 35. The latch 37 is normally urged toward latching position, as by means of a spring 38, but may be released against the urge of said spring as by electrically energizing a latch releasing solenoid 39. When the latch is released, the slide 36, under the influence of a biasing spring 40, may be moved toward the shoulder 35 to measure the size of a gauge element 12 at the gauging station 13 by pressing the element between the gauge block 14 and the shoulder 35. The gauge block and slide consequently will be held in a gauging position with respect to the shoulder 35, determined by the size of the gauge element 12.

The slide 36 is provided with a rack 36' drivingly connected, through a train of gears 41, suitably pivoted on the frame 11, with a stop bar 42 slidingly supported on the frame 11 in position adjacent the sliding frame 32 of the light source assembly 31, said stop bar comprising a rack driven by the gear train and having an end forming an adjustable stop which will occupy various positions transversely with respect to the record selecting movement of the slide 32, correspond with the various gauging positions occupied by the slide 36, depending on the various sizes of the gauge elements 12. The slide 32 is, of course, guided in suitable ways formed on the frame 11, and is also provided with a stepped portion 43 extending as at a 45° angle with respect to the sliding movement of the slide 32.

The slide 32, also, may be normally urged, as by means of a spring 44, in a direction to shift the stepped portion 43 toward the stop element 42. A driving cam 45 on a shaft 46 operates against a cam follower 47 on the slide 32 to cyclically move the slide 32 in a direction against the urge of the spring 44 to retract the stepped portion 43 away from the stop 42. A motor 48 is provided for driving the cam 45 in timed relation with, and as a part of, the sequence of operation of the selector mechanism, in order to retract the slide 32 against the spring 44, and to normally hold the slide in retracted or stand by position. After a gauge element 12 is delivered to gauging position, and, after the gauge block slide 36 has been released and moved to gauging position on the gauge element, the motor 48 may be operated to move the cam 45 so as to allow the slide 32 to move, under the influence of the spring 44, to a selecting position determined by the engagement of the stepped portion 43 with the stop 42. The stop 42 in each of the positions occupied by it, transversely of the movement of the slide 32, will engage a different step of the section 43, whereby, depending upon the dimension of the gauge element at the station 13, the slide 32 will be stopped and held by the element 42 in a position transversely of the record strip, corresponding with the dimension of the gauge element. Accordingly, the position of the light beam emitted by the source assembly on the slide 32 may be adjusted in alinement with the sound track thereon corresponding with the dimension of the gauge element at the gauging station.

At the conclusion of the playing of a record a solenoid may be operated to retract the slide 36 and the stop element 42 to stand-by position, whereupon the slide 32 will be released and drawn by the spring 44 against the cam 45 in its intermediate position shown in solid lines in Fig. 4. Thereafter, the cam 45 may be turned to its stand-by, or dotted line position, in Fig. 4, thereby retracting the slide 32 to stand-by position against the influence of the spring 44. In order to prevent jarring of the light source and lens assembly when the slide 32 is released from record selecting position by the retraction of the stop bar 42, a one-way dashpot may be connected between the frame 11 and the slide 32 to snub or retard the movement of the slide under the influence of the spring 44, such dashpot preferably being constructed to allow movement of the slide freely in a direction against the influence of the spring.

As shown, the gauge block slide 36 is mounted on the frame for sliding movement immediately above the sound strip 19, where it passes between the light source 33 and the cell 27. Accordingly, the slide 36 extends between the light source and the film, and the slide consequently is provided with a slot-like opening 49 therein, in position to register with the light source 33, when the slide is in gauging position. Said opening may be so arranged that an imperforate or opaque portion of the slide, when in retracted position, extends in the path of the light ray 34, thus acting as a shutter to prevent operation of the sound pick-up whenever the gauging mechanism is in retracted inoperative position. It will be noted, likewise, that the slide 36, as shown, moves longitudinally with respect to the sound strip, and that the slide 32 moves transversely of the strip.

This particular arrangement enables operating means 15 of simple construction, namely, the gear train 41, stop bar 42 and step portion 43, also the spring 44 and cam means 45, to be employed in accomplishing the selective shifting of the slide 32 in accordance with the gauging movement of the gauge block 14. The particular arrangement of the slides 32 and 36, however, is a matter of preference or convenience, and while the slide 32 in the illustrated embodiment necessarily is arranged for transverse record selecting movement with respect to the strip 19, it will be obvious that the slide 36 and the elements 14 and 35, forming the gauging station 13, may be disposed in any convenient location, allowing the gauge block slide to be connected to control the selecting movement of the member 32. It is obvious, also, that, in other applications than the illustrated embodiment, the slide 32 may take other forms and may be utilized for accomplishing the selective positioning of other than an adjustable light source pick-up. More particularly, the present invention encompasses the possibility of utilizing the movement of the gauge block 14, through suitable mechanism, for operating electrical selector switch means for the selective energizing of electrical circuits; or the movement of the gauge block may be employed, through suitable translation mechanism, for operating any desired mechanical selector means.

Accordingly, the present invention is not necessarily limited to the selection and photoelectric sound reproducion of sound track records; but the principle of selection, by determining a measurable characteristic of gauge elements, each having the measurable characteristic to an extent appreciably different from the others, may be applied to any desired selection operation. The present invention, however, provides means for delivering gauge elements of unlike measurable characteristic to the gauging station 13 in any selected sequence, whereby objects, articles, or operable devices may be presented in ordered succession corresponding with the selected order of the differentially characterized gauge elements. To this end, the gauge elements 12 preferably and most conveniently may comprise steel balls of graduated diameter, although it will be obvious that elements other than steel balls may be employed, and that any measurable characteristic other than diameter may be employed for selection purposes, in accordance with the broader aspects of the present invention.

In order to allow the gauge elements or balls 12 to be selected and presented in desired sequence at the gauging station 13, the present invention, as presented in the illustrated embodiment, may comprise a storage magazine 50 in which the elements 12 may be received and stored. To this end, the magazine 50 comprises a plate forming a wheel 51, having a circular rim 51' provided with preferably equally spaced pockets 52 around the rim. The illustrated apparatus is designed to select any one or more of thirty sound tracks on the record strip 19, and accordingly, the magazine contains thirty pockets 52. The pockets, however, are spaced apart on the wheel rim 51' to leave two blank pocket spaces in addition to the thirty ball receiving pockets. Adjacent pockets, thus, are spaced apart by a distance representing one thirty-second part of the circumference of the wheel, for reasons hereinafter explained.

The wheel, also, is mounted in stationary, horizontal position on the frame 11, as by means of the mounting blocks 53; and the wheel preferably is formed centrally with a hub 54 in which a pin or shaft 55 may be turnably journaled. In order to distribute the balls 12 each into its corresponding pocket 52, according to the size of the balls, the wheel is provided with track means 56, comprising diverging tracks extending across the upper ends of the pockets 52, whereby balls delivered on the track means 56 at the narrow end thereof, as from a ball delivery chute 57, may roll by gravity upon the diverging trackway until each ball reaches its corresponding storage pocket 52. The track means opposite each pocket is just wide enough to allow the corresponding ball to fall between the tracks and into its pocket. Accordingly, balls of unlike size delivered successively and in any order through the delivery chute 57, may be sorted and delivered each to its appropriate pocket, by rolling along the track means until such pocket is reached.

The balls are normally retained in the pockets by a retaining plate 58 mounted on and turnable with the stem 55, said plate having a marginal edge positioned to underlie the open lower ends of the pockets 52, to thereby support the balls 12 each in its corresponding pocket. The plate 58 is provided with an opening 59 therein, said opening being defined by a downwardly extending cylindrical collar 60 secured to the under side of the plate; and the plate carries a slide 61, comprising a strip of metal lying in the plane of the plate and slidable radially of the plate in a slideway 62 formed in the plate. The slide 61 is formed with an opening 63 therethrough, which opening is large enough to permit any of the balls 12 to pass therethrough when said opening is alined with the lower end of a pocket 52 containing such ball. The slide 61 is normally held in retracted position on the plate 58, as by means of a spring 64. When in such retracted slide position, the opening 63 is offset inwardly with respect to the cavities 52, and, consequently, the plate and slide will retain the balls in their pockets as the slide rotates with the plate beneath the pockets.

The shaft 55, on which the plate 58 is secured, is journaled at its upper end in the bearing 54, and the lower end of the shaft may be journaled, as in a bearing 65, on the frame 11. Means may be provided for turning the shaft 55 to position the slide 61 beneath any selected one of the pockets 52; and solenoid means 66 is provided for projecting the slide 61 on the plate 58 into position alining the slide opening 63 with any of the pockets 52 with which the slide is alined, by adjustment of the shaft 55. Accordingly, by turning the shaft 55 and operating the solenoid 66, the balls 12 may be released from the pockets 52, in any desired sequence, through the collar 60 and delivered thence in such selected order for presentation at the gauging station 13.

The solenoid 66 is preferably mounted on the plate 58, and is drivingly connected with the slide 61 by means of a suitable lever 67. In order to provide for energizing the solenoid 66 regardless of the turned position of the plate 58, the under side of the wheel 51 may be provided with a pair of concentric slip rings 68, insulated with respect to the wheel, and having each a contact terminal 69 projecting through and upwardly of the wheel for connection in a solenoid actuating circuit. The solenoid is provided with brushes electrically connected therewith and supported on, and electrically insulated from, the plate 58 in position to bear upon and make electrical contact with the slip rings 68.

In order to selectively turn the shaft 55 to selectively position the delivery opening and control slide of the plate 58 in registration with selected ball pockets 52, and shaft 55 may be provided with a gear 70, preferably mounted on the shaft adjacent its lower end. The gear 70 may be drivingly connected with a gear 71 on a drive shaft 72 journaled, as in bearings 73, on the frame 11, said shaft 72 projecting in accessible position, as at a side of the apparatus, and carrying a manually operable selector dial 74. This dial 74 may conveniently comprise a plate provided with finger openings 75 spaced apart along the periphery of the plate, there preferably being the same number of finger openings 75 in the plate 74 as there are ball pockets 52 in the wheel 51. The finger openings likewise are arranged to leave two blank opening spaces on one side of the wheel. The frame 11 carries a finger stop member 76, which may extend in front of and adjacent the wheel. One end of the stop member may be supported on the shaft 72, whereby the stop member may extend radially of the plate 74, with its shaft remote and embracing the edge of the plate 74 and being anchored on the frame 11.

The plate 74 and shaft 72, also the plate 58 and shaft 55, are normally urged, as by spring actuated means 77 mounted on the frame 11 and drivingly connected as with the shaft 72, toward stand-by or inactive position, determined by the engagement of a stationary stop element 78 on the frame 11 with a movable stop finger 79, which may conveniently be mounted on the shaft 72, or on the dial plate 74, or, for that matter, on the shaft 55 or the plate 58.

In registration with the openings 75, the member 76 may be formed with a finger stop seat 80 so that, by inserting a finger in any selected one of the openings 75, the plate 74 may be turned through a predetermined angular distance from inactive or stand-by position, and limited by engagement of the operating finger with the stop seat 80. Since the plate 74 is drivingly connected with the plate 58 through the shafts 55 and 72 and gears 70 and 71, operation of the plate 74 in the manner described will result in the positioning of the ball delivery slide and opening 59 opposite the selected ball cavity 52, which corresponds with the selected finger opening 75 that may have been dialed from its normal position to the dialing position in registration with the stop seat 80. The stop member 76 carries a switch actuating arm 81 movable thereon and having a portion 82 normally exposed at the finger stop seat 80. This arm 81 is operatively connected with normally open switch means 83 adapted to be closed by the dial actuating finger as the same engages in the seat 80, the finger, in entering the seat, depressing the member 82 and thereby closing the switch 83. Said switch 83 may be electrically connected in series with a suitable power source and the solenoid actuating terminals 69, whereby the solenoid 66 may be energized as a result of the dialing operation to actuate the slide and release a ball 12 from the pocket selected as a result of the dialing operation.

Upon release from its pocket, the selected ball 12 will fall into the cylindrical collar 60 and will be retained in said collar by a retaining ring 84 as the collar 60 is moved from its dialed ball selecting and receiving position, and returned to its inactive or stand-by position, determined by the stops 78 and 79, said returning movement being accomplished by the operation of the spring motor means 77 upon release of the dial 74 at the conclusion of the dialing operation.

The ring 84 is supported in stationary position on the frame 11, as by means of brackets 85, and the selected ball in the collar 60 may roll upon the ring 84 as the collar on the plate 58 returns to inactive or stand-by position. The ring 84 is provided with an opening 86 in position therein to register with the collar 60 when the same is in normal stand-by position. Accordingly, when the collar returns to its stand-by position after a dialing operation, the ball therein will drop through the opening 86 and will be received in a pocket of a transfer wheel 87 for temporary storage in said transfer wheel. This transfer wheel 87 is turnably supported for rotation about the axis of the shaft 55 and said transfer wheel 87 is turnable independently of the shaft.

To this end, the wheel 87 may be mounted on and carried by a tubular sleeve 88, which in turn may be journaled on the shaft 55. As shown, the sleeve extends within an enclosing bushing 89 which is turnable with respect to the sleeve 88, both sleeve 88 and bushing 89 being relatively turnable independently with respect to the shaft 55. The sleeve 88 projects at its opposite ends from the bushing 89 and carries the transfer wheel 87 on the upper projecting end of the sleeve 88, the lower projecting end of said sleeve carrying a ratchet wheel 90, a ball bearing 91 being preferably mounted between the ratchet wheel 90 and the adjacent end of the bushing 89, said ball bearing serving to journal a ratchet arm 92 for rocking movement about the axis of the shaft 55.

The transfer wheel 87 preferably comprises a circular disk having ball receiving pockets 100 circularly disposed in spaced relationship around the rim of the wheel, there being at least two more pockets 100 in the wheel 87 than there are active ball cavities in the magazine 50. In the illustrated embodiment, the transfer wheel 87 is formed with thirty-two pockets 100, the pockets 100, however, having angular displacement in the wheel 87 equal to the angular displacement of the ball pockets 52 in the magazine 50, there being thirty pockets 52 and two blank pocket spaces in the magazine and thirty-two cavities 100 in the transfer wheel 87. The transfer wheel also preferably carries ratchet teeth 101 projecting at the periphery of the wheel, there being a ratchet tooth for each pocket 100, and a spring pressed roller pawl 102 is provided, on the frame 11, in position to engage the teeth 101 in order to hold the transfer wheel in adjusted positions, while permitting it to rotate in one direction only about the axis of the shaft 55. Roller bearing means 103, if desired, may be interposed between the transfer wheel and the adjacent end of the bushing 89.

The ratchet arm 92 carries a spring pressed pawl 93 in position to cooperate with the ratchet wheel 90, to turn it in one direction when the arm is moved about the axis of the shaft 55. A spring pressed holding pawl 94, mounted on the frame 11 as by means of a bracket 95, is provided for preventing retrograde action of the ratchet wheel 90. The ratchet arm 92 may be rocked about the axis of the shaft 55 to a limited extent, determined by stops 96 formed in a bracket, mounted on the frame 11, in position to engage a finger 97 on the arm 92. Spring means 98, anchored at one end on the frame 11 and at the other on the arm 92, may be utilized to normally urge the arm in a direction to advance the ratchet wheel 90. Normally inactive solenoid means 99, mounted on the frame 11 and drivingly connected with the arm 92, may be provided to retract the arm against the influence of the spring. Accordingly, the ratchet wheel 90 will normally remain stationary.

When the solenoid 99 is energized, it will retract the arm 92 and pawl to a cocked driving position, through a distance representing slightly more than the tooth pitch of the ratchet wheel. During the cocking operation, the holding pawl 94 will prevent retrograde movement of the wheels 90 and 87. As soon as the solenoid 99 is de-energized, however, the spring 98 will draw the arm 92 and pawl 93 in a direction to advance the wheels 90 and 87 through an angular displacement equal to the angular separation of the pockets 100, thereby advancing each pocket to the position previously occupied by an adjacent pocket. Accordingly, each time the solenoid 99 is energized and then de-energized, the wheel 87 will be moved to present a succeeding pocket 100 in registered position beneath the opening 86 in the ring 84.

Means is provided for so shifting the wheel 87 prior to the arrival of the collar 60 at its stand-by position in alinement with the opening 86, after it has received a ball 12 as the result of a dialing operation. Such means may conveniently comprise a switch 104, mounted on the frame 11, and having an actuating member 105 extending above the ring 84 adjacent the opening 86 and in the path of a ball contained in the collar 60. The switch 104 is sufficiently sensitive to be actuated by the weight of a ball 12 in passing over the actuating member 105 in traveling to the opening 86; but the switch 104 will remain in normally open position in the event that the collar 60 returns to stand-by position without containing a ball. Accordingly, the wheel 87 will be shifted by the operation of the solenoid 99 only in the event that the collar 60 contains a ball to actuate the switch 104 in passing into alined position with the opening 86. Each time the apparatus is dialed to select a ball from the magazine 20, if a ball be delivered and transferred to the opening 86, the wheel 87 will shift and will receive the ball through the opening 86 in one of the pockets 100. If no ball is delivered as the result of a dialing operation, as, for example, if the apparatus is dialed to obtain a ball that has previously been delivered, the wheel 87 will not be advanced but will remain stationary. If, however, after the delivery and reception of one ball in a pocket of the wheel 87, a successive ball is delivered, as the result of a successive dialing operation, such successive ball, in passing the switch blade 105, will cause the wheel 87 to be advanced so that such successive ball will be received in the empty pocket next adjacent a pocket in which a previously dialed ball shall have been received. Accordingly, any number of balls may be selected, as the result of successive dialing operations, and delivered in the order of selection into successive pockets of the transfer wheel 87. Any number of balls up to the entire capacity of the magazine 50 may thus be delivered and received in the pockets of the transfer wheel.

The balls 12 thus delivered in the pockets 100, as the result of dialing operations, will be retained in said pockets by a holding plate 106 comprising a disk centrally mounted and supported on the bushing 89, with the peripheral portions of the disk extending to and underlying the lower open end of the pockets 100. This disk is provided with a single opening 107 in its peripheral portions, in position successively to aline with the lower ends of the pockets 100. Means is provided for advancing the disk 106 with the transfer wheel 87 while the pockets 100 thereof are being loaded with selected balls. Each time the wheel 87 is advanced as the result of the actuation of the ratchet means 92, the disk 106 will move with the wheel 87. The disk 106, when the apparatus is inactive, as at the conclusion of its cycle of operation, will be so positioned with respect to the wheel 87 and ring 84 that the opening 107 of the disk will be in alinement with the pocket 100 of the wheel which is in alinement with the opening 86 of the ring. As the first ball of a selection series is dialed and delivered in the collar 60 toward the opening 86, said ball, in passing the switch operating blade 105, will move the wheel 87 and the disk 106 forwardly one step, so that said first delivered ball will enter a pocket 100 which is next adjacent the pocket with which the opening 107 is in alinement. Thereafter, as balls are successively delivered in successive pockets of the wheel 87, the disk 106 will continue to be advanced with the wheel, whereby to retain all of the selected balls in the pockets of the wheel.

After the wheel 87 has thus been loaded to a desired extent with selected balls in a selected sequence, operating means is provided for turning the disk 106 through the bushing 89 on which it is mounted, in step-by-step fashion and in retrograde direction, the wheel 87 being held in stationary position to progressively aline the opening 107 with the ball containing pockets 100, whereby the balls therein may be released from the pockets through the opening 107 in the same successive order in which they were delivered into the pockets.

As each ball 12 drops through the opening 107, it is received in a gravity trough or chute 108 disposed circularly beneath the peripheral pocketed portions of the wheel 87, said trough or chute having a lower delivery end leading to the gauging station 13. A ball thus dropped into the chute will roll under the influence of gravity action along the chute and be delivered thence at the gauging station. The operating means for retrograding the disk 106 to successively release the balls from the transfer wheel, may include control means hereinafter more fully described for preventing retrograde movement of the disk 106 until a previously delivered ball has reached the the gauging station and has there performed its article or device selecting function, and thereafter has been ejected from the gauging station to make room for the delivery of a successive ball.

In order to advance the plate 106 in step with the wheel 87 during the loading of selected balls therein, and thereafter to impart step-by-step retrograde movement to the plate 106 to successively deliver the balls from the transfer wheel into the chute 108, the bushing 89 may be provided with a two-way ratchet mechanism, comprising a ratchet wheel 110 on the bushing 89 and pawl mechanism 111 cooperatively associated with the ratchet wheel 110 and mounted on a support plate 112 forming a part of the frame 11. The two-way pawl mechanism 111 may be of any suitable or preferred character, a convenient two-way pawl mechanism being illustrated more particularly in Figs. 7 and 8 of the drawings, and comprising a rockable pawl arm 113 journaled on the bushing 89 for rocking movement about the axis of the shaft 55. The mechanism comprises a pair of spring pressed holding pawls 114 mounted on the plate 112 and bearing oppositely on the wheel 110 to normally prevent wheel movement in either direction. A pair of driving pawls 115, pivoted on the arm 113 and normally spring pressed to drivingly engage the periphery of the wheel 110, is also provided. The arm 113 is also drivingly connected with opposed solenoids 116 and 116' mounted on the frame plate 112 and adapted, when energized, to move the arm 113 in one direction or the other. Spring means 117 anchored on the frame member 112 and bearingly connected in opposite directions on the arm 113, are provided to normally hold the same in a neutral inactive position.

Accordingly, if either solenoid be energized, one of the springs 117 will be tensioned and will operate to return the arm 113 to its neutral position as soon as the energized solenoid again becomes de-energized. Interengaging cam means are provided whereby when one of the solenoids, say, the solenoid 116, is energized, one of the driving pawls 115 and one of the holding pawls 114 will be released and, upon the de-energizing of the solenoid, the other driving pawl will be moved by the spring means 117 to turn the wheel 110 in a direction to advance the wheel 110 and the cover plate 106 connected therewith. When the other solenoid, say, the solenoid 116', is energized and the de-energized, however, the pawls operate to turn the wheel and plate 106 in the opposite direction. By energizing and de-energizing one of the solenoids 116 contemporaneously with the energizing and de-energizing of the solenoid 99, the ratchet mechanisms 93 and 111 may be actuated at the same time to simultaneously move the wheel 87 and disk 106 in a forward or ball loading direction. By successively energizing the other solenoid 116', however, after the wheel 87 has been loaded with a desired number of balls, the disk 106 may be progressively moved in the reverse or ball releasing direction to successively deliver the balls from the pockets 100 and into the chute 108.

It will be seen from the foregoing that, by successively dialing the member 74, the balls 12 may be selected and released from the pockets 52 in any selected order, and delivered in the order of selection into the successive pockets 100 of the transfer wheel 87. Any desired number of balls, up to all the balls that the magazine 50 is designed to hold, may be thus selected and delivered in selected order to the transfer wheel. The balls may be delivered from the transfer wheel successively, in the order of their selection, and transferred by way of the gravity chute 108 to the gauging station 13. After having performed its gauging and selecting function at the station 13, each ball may be returned to the magazine 50.

To this end, a normally closed retaining member or gate 118 may serve to hold the ball in the gauging station until the gauging operation has been completed, said gate being preferably spring pressed to its normal ball retaining position, and being operatively connected with a gate opening solenoid 119 adapted to be energized at the conclusion of the ball gauging operation, to open the gate and allow the ball to roll from the gauging station to an elevator mechanism 120, comprising a guide tube 121, into the lower end of which the ball may be delivered, and a spring pressed ball kicking plunger 122 adapted for operation as by means of a solenoid 123, to kick a ball from the lower to the upper end of the tube 121. At its upper end, the tube may be bent to form a ball discharge spout 124 positioned to deliver the balls, as by gravity, into the ball delivery chute 57 for distribution thence along the divergent track means 56 into the ball receiving pockets 52 of the magazine means 50.

In order to actuate the several operable devices of the selector apparatus, an electrical control system, as depicted more particularly in Fig. 12 of the drawings, may be employed. As shown in Fig. 12, the control apparatus for operating the selector mechanism may include electrical circuits extending between power conductors 125 and 126, including a series circuit between said power conductors comprising the slide gate opening solenoid 66, the dial operated switch 83 and a control switch 127 hereinafter more fully described. By closure of the switch 83 as the result of a dialing operation, the switch 127 being closed, the solenoid 66 may be energized to retract the ball release slide 61 and allow the selected ball to be delivered to the transfer wheel 87. During passage of a ball to the transfer wheel it closes the switch 104 which is included in a series circuit between the power conductors 125 and 126, in which series circuit the wheel and cover plate advancing solenoids 99 and 116 are interconnected in relatively parallel relationship. Consequently, when a ball closes the switch 104, in traveling to the ball delivery opening 86, both the wheel 87 and the cover plate 106 will be advanced simultaneously one step by the operation of the solenoids 99 and 116.

The gauge block slide 36 is normally retained in open or retracted position by the spring pressed latch 37. The plate retrogressing solenoid 116' may be included in a series circuit extending between the conductors 125 and 126, said circuit including a normally open preferably manually operable start switch 128 and control switches 151, 156 and 127, hereinafter more fully described. Accordingly, after the desired number of balls 12 have been selected and deposited in the transfer wheel 87 as the result of successively dialing the member 74, the switches 127, 151 and 156 being closed, the switch 128 may be closed to energize the plate retracting solenoid 116'.

In order to prevent false operation of the apparatus, as by operation of the dialing mechanism or by closure of the start switch 128, during the operating cycle of the apparatus, after release from the transfer wheel of the first gauge element of a selected series of elements in the transfer wheel, the circuits of the release solenoid 66 and of the plate retrogressing solenoid 116', through the switch 128 may be provided with blocking means for rendering the same inoperative, during the period following operation of the switch 128 to release such first selected gauge element of a selected series from the transfer wheel, and until the apparatus reaches stand by condition, at the end of its operating cycle, after delivery of all the gauge elements of a selected series, from the transfer wheel, to and through the gauging station, and return thereof to the storage magazine.

To this end the switches 83 and 128 may be connected to one side of the power line, as for example the conductor 125, through the control switch 127, means being provided to open the switch 127 upon the operation of the switch 128 to release the first gauge element of a selected series from the transfer wheel and to thereafter hold the switch 127 open until all of the gauge elements of the selected series shall have been released from the wheel, passed through the gauging station and returned to the storage magazine. Accordingly, operation of the switches 83 or 128, during the period when the apparatus is delivering the gauge elements to the gauging station, will be ineffective either to select and deliver additional gauge elements, from the magazine to the transfer wheel, or to release any gauge element from the transfer wheel for delivery to the gauging station, as while a preceding gauge element is in selecting position at the station. The switch 127 thus operates as conditioning means to render the circuits through the switches 83 and 128 operable only when the apparatus for successively delivering the selected series of gauge elements to the gauging station is inactive, and vice versa.

As shown in the drawings the switch 127 may comprise a normally closed switch, and the blocking means for controlling the circuits through the switches 83 and 128, in addition to said switch 127, may comprise a solenoid 147 for opening the switch 127, a latch 149 for holding the switch in open position, and a solenoid 150 for releasing the latch to allow the switch to close. The solenoids 147 and 150 thus in effect respectively comprise switch opening and switch closing solenoids, the switch 127 remaining open or closed, as the case may be, after operation of one solenoid and until the other is operated.

The switch opening and closing solenoids, of course, may be operated by any suitable means causing them to act respectively in response to release of the first gauge element of a selected series from the transfer wheel and in response to the completion of the operating cycle of the apparatus. As shown, however, the solenoids 147 and 150, most conveniently may be controlled in response to the movement of the plate 106. This plate, during selection and loading of the gauge elements in the transfer wheel 87, is advanced, in step-by-step fashion, in one direction only, by operation of the solenoid 116, and is retrogressed, in step-by-step fashion, in the opposite direction only by operation of solenoid 116' during the operating cycle of the apparatus in delivering a selected series of gauge elements to and through the gauging station. At the conclusion of the retrogressive gauge element releasing cycle, the plate 106, as hereinafter more fully explained, is advanced one step to its stand by or starting position by operation of the solenoid 116. Accordingly, the solenoids 147 and 150 may be controlled to close the switch 127 and keep it closed, so long as the plate is in its advancing or gauge element receiving phase; and the solenoids 147 and 150 may be controlled to open the switch and keep it open, so long as the plate 106 is in its retrogressing or gauge element releasing phase. To this end the solenoids 147 and 150 may be connected, respectively, in parallel relation with the plate retrogressing and advancing solenoids 116' and 116 so that the switch opening solenoid 147 will be actuated each time and only when the retrograding solenoid 116' is energized, while the switch closing solenoid 150 will be energized each time and only when the plate advancing solenoid 116 is energized.

Alternately the same ultimate result may be accomplished by controlling the solenoids 147 and 150 directly by the advancing and retrogressing movement of the plate 106. To this end the solenoids 147 and 150 may be connected in circuit between the line conductors 125 and 126 under the control of suitable control switch means adapted to energize the solenoid 147 while and so long as the plate 106 is in its retrogressive or element releasing phase and to energize the solenoid while and so long as the plate is in its advancing or element receiving phase. This may be accomplished by providing switch operating teeth or lugs, on the plate 106, as at the edge thereof, in position to operatively engage the control switch means. These lugs may be spaced on the plate 106 so that the control switch means will be operated, in one direction or the other, each time the plate is moved one step in either direction. The control switch means also may be of the so called toggle type to remain in position thrown in one direction until operated in the opposite direction. The control switch means, however, is preferably of the sort having normally open switch elements so that it may be closed momentarily through the solenoid 147, each time the plate 106 is moved one step in its regressive or element releasing direction of movement, the switch means being closed momentarily through the solenoids 150 each time the plate 106 is moved one step in the opposite or element receiving direction. In any case, the result will be to hold the switch 127 open, after release of the first gauge element of a selected series from the wheel 87, until the last element of the series shall have been passed through the gauging station and returned to the magazine; and operation of the dialing or gauge element selecting mechanism, as well as unwanted release of gauge elements from the wheel 87 by operation of the manual switch 128, will be inhibited.

By retrogressing the late 106 one step, by action of the solenoid 116', through closure of switch 128, the first ball 12 in the transfer wheel 87 may be released for transfer to the gauging station 13. As said ball enters the gauging station, it falls on a switch operating arm 129' and closes switch 129, which is held closed so long as the ball remains in the gauging station. The switch 129 may be included in a series circuit extending between the conductors 125 and 126, said circuit including the latch releasing solenoid 39 and a normally open switch 130, which switch is held closed by the slide 36 when the same is in open position, but which opens when the slide closes under the influence of the spring 40 upon the retraction of the latch 37 when the solenoid 39 is energized by the closure of the switch 129.

As the slide 36 moves to closed or gauging position upon a ball at the gauging station 13, the movement of the slide will cause closure of a normally open switch 131, said switch being interconnected with the driving motor 25 to form a series circuit extending between the conductors 125 and 126. According, the motor 25 will operate as long as the switch 131 remains closed, that is to say, as long as the slide remains in closed gauging position under the influence of the spring 40. Operation of the motor will cause the record strip 19 to be delivered past the sound reproducing mechanism 18, while the gauging position of the slide, as determined by the diameter of the ball at the gauging station, will determine which of the available sound records will be reproduced.

To this end, means is provided for starting the motor 48 in operation to actuate the selection mechanism 15, as the slide 36 moves to gauging position after release of the latch 37. The motor 48 may be connected between the line conductors 125 and 126, in series with a relay control switch 134, like the switch 127 and having operating solenoids 133 and 143 respectively serving to open and close the switch 134. As shown, the switch 134 may be of the normally closed type, opened by operation of solenoid 133, latchable in open position by a spring pressed latch 135 and closeable upon release of the latch by operation of the solenoid 143. The motor starting means may include a normally open starting switch 136 adapted to be momentarily closed by the slide as it moves to gauging position after release of the latch 37. The switch 136 accordingly may be connected in series with the switch closing solenoid 143, so as to start the motor by closing switch 134, in response to the momentary closure of switch 136, as the slide moves to closed position on a gauge element at the station 13.

The motor 48, in addition to the cam 45, drives a switch closing cam wheel 137 which is adapted, during rotation thereof, to successively close and open a series of normally open switches 138, 139, 140, 141, and 141'. Since it is necessary to turn the cam 45 through one-half of a complete revolution as a part of the ball gauging operation, in order to adjust the selector slide 32 for the selection of a desired record to be reproduced, means is provided for stopping the motor 48 by energizing the solenoid 133 to open the switch 134, after the cam 45 has turned from its starting position through one-half of a complete revolution. This is accomplished by closure of the switch 141 by operation of the cam wheel 137. The cam wheel 137 also will have turned, from its initial or starting position, through one-half of a revolution when it closes the switch 141. The switch 141 is included in a series circuit between the conductors 125 and 126, which circuit also includes the solenoid 133. The solenoid 133, when energized, serves to open the switch 134 to disable the motor 48. Accordingly, when the cam 137 causes the switch 141 to close, the cam driving motor 48 and the driven cams 45 and 137 will stop. The apparatus, thus, will have been adjusted for the operation of the sound reproducing apparatus for the reproduction of a desired record corresponding with the ball gauged at the gauging station.

At the conclusion of the reproduction of a selected record, any suitable or preferred actuating means may be operated to cause closure of a normally open control switch 132. The switch 132 may be operated by any end record actuating means, including a high frequency impulse recorded in the record strip, or mechanical switch throwing means on the record element itself, or on the record supporting or shifting mechanism. Where the record element comprises a film strip, the switch operating means may comprise an opening in the strip disposed opposite the terminal ends of the record tracks, whereby the record strip itself may hold the switch 132 in open position and allow it to close when the portion containing the switch closing opening is delivered to the switch 132 during the traveling movement of the record strip. The switch 132 may be connected in parallel with the switch 136, that is to say, in series with the operating solenoid 143 of the switch 134, so that when the switch 132 is closed at the conclusion of the reproduction of a record, the solenoid 143 will become energized to close the switch 134, and start the motor 48. Thereafter, the cam wheel 137, in returning from its intermediate stop position to its normal stand by stop position, will operate to successively close the switches 138, 139, 140 and 141'.

The switch 138 is interconnected in a circuit extending between the conductors 125 and 126, said circuit including a pair of solenoids 119 and 142, connected in parallel relation, so that upon the closure of the switch 138, the solenoids 119 and 142 will immediately be energized. The solenoid 142 operates to retract the slide 36 from closed to open position, in which the slide thereafter will be held by the latch 37. The solenoid 119 operates to open the gate 118, whereby the ball may be delivered from the gauging position to the return elevator 120. If desired in place of the switch 138, a pair of switches, one for each of the solenoids 142 and 119, operable successively by the cam 137, may be provided to first retract the slide 36 and then open the gate 118.

Upon closure of the switch means 139 by further rotation of the cam wheel 137, the ball kicking solenoid 123 will be energized to return the ball to the magazine 50, said solenoid being in series circuit with said switch means 139 between the conductors 125 and 126.

The switch 140 may be connected in parallel relation with the circuit containing the switches 128, 127, 151 and 156, that is to say, the switch 140 is in series with the plate retrograding solenoid 116' to form a circuit extending from the conductor 125, through the switch 140 and the solenoid 116' to the conductor 126. Accordingly, upon closure of the switch 140 by action of the cam wheel 137, the cover plate 106 will be retracted one step, to thereby release a successive ball, from the wheel 87, for delivery to the gauging station, whereupon the cycle of operation of the gauging and selecting mechanism will be repeated, automatically.

The switch 141' is in parallel relationship with the switch 141, and, accordingly, will control the solenoid 133. When the cam wheel 137 closes the switch 141', the solenoid 133 will open the switch 134, thus disabling the motor 48 and stopping the cams 45 and 137 in their normal stand by position ready for a repeat performance.

If desired the switches 140 and 141', as shown, may be arranged for simultaneous operation, or the switch 140 may be arranged to operate a moment before the switch 141'. In either case, a successive gauge element will be released from the wheel 87, at the conclusion of the cycle of operation induced by the release of a preceding gauge element from the transfer wheel.

It will be seen that the apparatus, after the initial closure of the switch 138, will continue to repeat the operating cycle of the gauging and selecting means so long as balls remain in the transfer wheel. At the conclusion of the operating cycle controlled by the last gauge element of a series delivered from the transfer wheel, the switch 132 will be closed, thereby closing the switch 134 and starting the motor 48 to cycle the cam wheel 137 from its intermediate stopped position to its final or stand by position, such operation of the cam wheel will successively open the slide 36, open the gate 118, actuate the ball return relay 123, actuate the plate retract relay 116', and finally energize the relay 133 to open the switch 134 and stop the motor 48. Since there will be no ball released from the transfer wheel as a result of the final actuation of the relay 116', no ball will be delivered to the gauging station. Thus, the switch 129 will remain open and the mechanism will come to rest, in position ready to be re-operated for the selection of the balls 12 in the same or any other desired sequence.

In this connection, the plate 106 will have been returned into a position of maximum retraction, with its opening 107 in alinement with the ball cavity 100 of the wheel 87, which is one step behind the opening 86. Accordingly, in order to bring said plate opening 107 into alinement with the opening 86, a switch 145 is provided, in parallel connection with the switch 104. The switch 145 is normally open but may be closed by a projection 145' on the plate 106 as it reaches its position of maximum retraction, to thereby energize the solenoids 99 and 116' to advance the wheel 87 and plate 106 to stand by position in which the openings 86 and 107 are in alinement. Consequently, as the first ball of a new series is delivered past the switch 104, the solenoids 99 and 116 will again advance the wheel and cover plate, so that said first ball will be received in a pocket 100 of the transfer wheel with which the opening 107 of the cover plate 106 is not in alinement.

It will be noted that the switch 145 is actuated to advance the plate one step at the conclusion of the step-by-step retrogressing or gauge element releasing phase of operation of the plate 106. Accordingly, upon closure of the switch 145, the solenoid 150 will also be energized to close the switch 127 to recondition the circuits through the switches 83 and 128 for operation. The solenoid 150 will thus be energized if, as shown, it be connected in parallel relation with the plate advancing solenoid 116, or if it be connected for operation by control switch means actuated by advancing movement of the plate. After being thus closed, the switch 127 will remain closed during successive dialing operations for the selection and transfer of gauge elements to the transfer wheel. Each successive forward movement of the plate 106, by operation of solenoid 116, during the loading of the transfer wheel will merely activate the switch closing solenoid 150, thereby allowing the switch 127 to remain closed. The switch 127 thus will remain closed during the gauge element selecting and wheel loading phase and until the switch 128 is operated to retrogress the plate 106 by operation of solenoid 116', and thus release the first gauge element of the selected series for delivery to the gauging station. Upon such closure of the switch 128, the solenoid 147 will be energized to open the switch 127; and said solenoid 147 will be thus energized if, as shown, it be connected in parallel with the solenoid 116' or if it be connected for operation by control switch means actuated by retrogressive movement of the plate. After being thus opened the switch 127 will remain open during successive retrogressive movements of the plate 106, in releasing the gauge elements from the transfer wheel. Each successive retrograde step of the plate during its gauge element releasing phase will merely activate the switch opening solenoid 147 thereby allowing the switch to remain open. During this phase, it will be noted, the switch 127 cannot be closed because the closing solenoid 150 cannot be actuated by separate control switch means operated by plate advancing movement, the plate, during such phase, moving only in retrograde direction; nor can the solenoid 150 be actuated by the switches 104 or 145, during this phase, if the solenoid 150 be connected in parallel relation with the solenoid 116. The switch 145 is closed by the plate 106 only after all gauge elements have been released from the transfer wheel, while the switch 104 is operated only by a gauge element in passing from the magazine to the transfer wheel. This cannot happen so long as switch 127 remains open and blocks operation of the solenoid 66, which releases gauge elements for transfer past the switch 104.

It may also be desirable to provide protection against operation of the plate retrogressing solenoid 116', while the apparatus is in stand by condition and before the switch 83 has been actuated, as the result of an initial dialing operation, or during a dialing operation before the selected gauge element shall have operated the switch 104 in passing to the transfer wheel. To this end the normally closed switch 151 may be included in series with the switch 128. The switch 151 may be similar to the switch 127, and may be opened by operation of a switch opening solenoid 152 and thereafter held open by a spring pressed latch 153 until released for closing movement by operation of a switch closing solenoid 154. The switch opening solenoid 152 may be connected in series circuit with an operating switch 155 between the conductors 125 and 126. The switch 155 may be mechanically connected with the switch 145 so that the switch 155 will be closed, to thus open switch 151 and disable the start switch 128, as the equipment is set to stand by condition when the plate 106 reaches its position of maximum retrogression. Thereafter the switch 151 will remain open until the closing solenoid 154 is actuated. This solenoid 154 may be connected in parallel with the solenoid 66 so that the switch 151 may be closed as the result of the selection of the first gauge element of a selection series, by operation of the dialing mechanism, including the switch 83, following the restoration of the apparatus to stand by condition. Retrogression of the plate 106, with respect to the transfer wheel, will thus be prevented until a gauge element shall have been released from the magazine for deposit in the wheel 86. After the first selected gauge element of a series shall have been released for deposit in the transfer wheel, the circuit through the start switch will be conditioned for operation, by closure of the switch 151, which thereafter will remain closed until the switch 155 is again operated.

It is also desirable to disable the circuit through the switch 128 during the dialing interval and until a selected element shall have been deposited in the transfer wheel. If the plate 106 be retrogressed, to release a previously selected gauge element from the transfer wheel, during the dialing period, while the selector plate 106 is moving toward a selected position, to release a gauge element from the magazine, and before the switch 83 closes to release the selected ball from the magazine, the resulting operation of the solenoid 147 will open switch 127 and block operation of the release solenoid 66 when the switch 83 does close. The selected gauge element consequently will not be released. If, however, during a dialing operation the switch 128 is closed to retrogress the plate 106 and release a gauge element from the transfer wheel, at the instant when a dialed gauge element operates the switch 104, both solenoids 116 and 116' might be energized simultaneously, or nearly so, and the solenoid 99 would also be energized with the solenoid 116, with the result that the plate 106 might either remain stationary or might retrogress or might advance with the wheel 87, depending on which of the switches 104 or 128 was first to close. In such a situation there are obvious possibilities of faulty operation if not damage to the apparatus. Accordingly, a normally open switch 156 may be included in series with the switch 128. This switch may be mounted on the frame 11, in any convenient position, to be closed by the dial 74 or the plate 61, or the shafts 55 or 72, whenever and so long as the dial 74 is in normal stand by position. As soon as the dial is moved from stand by position, as in a dialing operation, and until the dialing apparatus, thereafter, returns to stand by position, the switch 156 will be and remain open, whereby the circuit through switch 128 will be inoperative. Accordingly the switch 128 cannot be operated to retrogress the plate 106 during a dialing operation and until the selected gauge element shall have operated the switch 104 and shall have dropped into the transfer wheel, as the dialing mechanism reaches stand by position at the conclusion of the dialing cycle.

It may also be desirable, as an additional refinement, to utilize, in the operating circuit of the switch 83, a switch similar to the switch 151, in order to disable the circuit of the switch 83 after it has been operated to release a gauge element, from the magazine into the receiver 60. Such a control switch, connected in series between the switch 83 and solenoid 66, might have its opening solenoid connected in parallel with the solenoid 66, and its closing solenoid connected between the conductors 125 and 126, in series with the switch 156 or a similar normally open switch adapted to be closed by the dialing mechanism when in stand by position. Such a control switch, connected in circuit with the switch 83 and release solenoid 66, would condition the circuit for operation by the switch 83, each time the dialing mechanism reaches stand by position. Thereafter the circuit would remain operative until operation of the solenoid 66 to release a gauge element into the pocket 60. The circuit would then become inoperative to actuate the solenoid 66 for the release of a successive gauge element into the pocket 60, and would remain inoperative until the dialed element in the pocket 60 shall have been transferred, thence, through the opening 86 and into a pocket of the transfer wheel, said gauge element being transferrable from the pocket 60 only when the dialing mechanism is in stand by position, in which position the circuit of the solenoid will be reconditioned for operation. Such protective arrangement will prevent the possibility of jamming the apparatus as by delivery of two gauge elements into the pocket 60, as by accidental or mischievous operation of the switch 83 more than once during a single dialing cycle.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Selection apparatus comprising magazine means for storing a plurality of roller elements having unlike linear dimensions, means forming a gauging station for measuring the characteristics of said roller elements, selector and delivery means operable to select and deliver said elements, in selected sequence, to said gauging station, and means, operable at said gauging station, in accordance with the dimension of a roller element being measured at said station, to select items corresponding with said roller elements, said delivery means comprising a pocketed transfer wheel, manually operable means for releasing selected roller elements from said magazine means, in selected order, and for delivering said elements, in such selected order, in the pockets of said transfer wheel, and means operable to release said selected elements, in order of selection, from said wheel, for delivery to said gauging station.

2. Selection apparatus comprising magazine means for storing a plurality of roller elements having unlike linear dimensions, means forming a gauging station for measuring the characteristics of said roller elements, selector and delivery means operable to select and deliver said elements, in selected sequence, to said gauging station, and means, operable at said gauging station, in accordance with the dimension of a roller element being measured at said station, to select items corresponding with said roller elements, said magazine means comprising a member formed with a series of pockets therein, said selector means comprising a retaining plate for normally holding roller elements in said pockets, said plate having a release opening therein, a shutter normally closing said opening, said member and plate being relatively shiftable to align said opening with any selected one of said pockets, means operable to retract said shutter to release a roller element from the selected pocket through said opening for delivery to said gauging station.

3. Selection apparatus comprising magazine means for storing a plurality of roller elements having unlike linear dimensions, means forming a gauging station for measuring the characteristics of said roller elements, selector and delivery means operable to select and deliver said elements, in selected sequence, to said gauging station, and means, operable at said gauging station, in accordance with the dimension of a roller element being measured at said station, to select items corresponding with said roller elements, said magazine means comprising a member formed with a series of pockets therein, said selector means comprising a retaining plate for normally holding roller elements in said pockets, said plate having a release opening therein, a shutter normally closing said opening, dialing means operable to relatively shift said member and plate to align said opening in pocket selecting position with any selected one of said pockets, and means operable when said dialing means is in pocket selecting position to retract said shutter to release a roller element from the selected pocket through said opening for delivery to said gauging station.

4. Selection apparatus comprising magazine means for storing a plurality of roller elements having unlike linear dimensions, means forming a gauging station for measuring the characteristics of said roller elements, selector and delivery means operable to select and deliver said elements, in selected sequence, to said gauging station, and means, operable at said gauging station, in accordance with the dimension of a roller element being measured at said station, to select items corresponding with said roller elements, said delivery means comprising a transfer wheel formed with pockets, a delivery track for conveying selected roller elements from said magazine means to a delivery station on said track for deposit in the said pockets, means for relatively shifting the wheel and track in one direction to align said delivery station successively with said pockets, means operable by a roller element in travelling said track to said delivery station to so shift the wheel and delivery station whereby successively delivered roller elements may be deposited in progressively adjacent pockets, a retaining plate for holding said roller elements in said pockets, said plate having an opening and means to relatively shift said plate and the transfer wheel to successively align said opening with said pockets for the release of roller elements from said pockets, through said opening for delivery to said gauging station.

5. Selection apparatus comprising a magazine for storing a number of gauge elements, a pocketed transfer wheel, and means to turn the same to present the pockets thereof successively beneath a receiving station, means operable to release said elements from said magazine in succession and to deliver the same into the pockets of said wheel at said station, means to advance said wheel as an element is delivered at said station to present an unoccupied wheel pocket for its reception, a retaining plate movable with said wheel for retaining elements in said pockets, said plate having a discharge opening in position to register with said pockets, and retracting means operable to shift said plate with respect to said wheel progressively to register said discharge opening successively in alignment with said pocket to release said elements therefrom.

6. Selection apparatus comprising a magazine for storing a number of gauge elements, a pocketed transfer wheel, and means to turn the same to present the pockets thereof successively beneath a receiving station, means operable to release said elements from said magazine in succession and to deliver the same into the pockets of said wheel at said station, means to advance said wheel as an element is delivered at said station to present an unoccupied wheel pocket for its reception, a retaining plate movable with said wheel for retaining elements in said pockets, said plate having a discharge opening in position to register with said pockets, and retracting means operable to shift said plate with respect to said wheel progressively to register said discharge opening successively in alignment with said pockets to release said elements therefrom, means operable in response to delivery of said gauge elements from said wheel for selecting and conditioning for operation operable devices corresponding each with one of said gauge elements, and means to actuate said retracting means upon the conclusion of the operating cycle of each of said operating devices.

7. Selection apparatus comprising a magazine for storing a number of gauge elements, a pocketed transfer wheel, and means to turn the same to present the pockets thereof successively beneath a receiving station, means operable to release said elements from said magazine in succession and to deliver the same into the pockets of said wheel at said station, means to advance said wheel as an element is delivered at said station to present an unoccupied wheel pocket for its reception, a retaining plate movable with said wheel for retaining elements in said pockets, said plate having a discharge opening in position to register with said pockets, and retracting means operable to shift said plate with respect to said wheel progressively to register said discharge opening successively in alignment with said pockets to release said elements therefrom, means operable in response to delivery of said gauge elements from said wheel for selecting and conditioning for operation operable devices corresponding each with one of said gauge elements, and means to actuate said retracting means upon the conclusion of the operating cycle of each of said operating devices, whereby the delivery opening of said retaining plate will be returned into position opposite the wheel opening immediately in advance of said delivery station at the conclusion of the delivery from said wheel of a selected series of gauge elements, and means operable to advance said plate to position the delivery opening thereof in starting position opposite the wheel opening at said delivery station.

8. Record playing apparatus comprising the combination with operating means, including means for supporting a plurality of records and for selectively traversing them in playing position in said apparatus, including a record traversing motor, and an adjustable record selecting member, of selection apparatus comprising a magazine for storing a number of gauge elements corresponding with the records, a pocketed transfer wheel and means to turn the same to present the pockets thereof successively at a receiving station, means operable to release said elements from said magazine in succession and to deliver the same successively into the pockets of said wheel, at said station, ejecting means operable to deliver said elements successively from said wheel to a gauging station, means operable in response to delivery of said gauge elements at said gauging station for adjusting said record selecting member for the selection of a record corresponding with the gauge element at said gauging station, and for operating said traversing motor for the playing of the selected record, and means to actuate said ejecting means upon the conclusion of the operating cycle of said operating means.

9. Record reproducing apparatus as set forth in claim 8, including means to advance said transfer wheel as a gauge element is delivered at said receiving station whereby to present an unoccupied wheel pocket for its reception, said ejecting means comprising a retaining plate movable with said transfer wheel during the loading of gauge elements therein and adapted to retain gauge elements in the pockets of said wheel, said plate having a discharge opening in position to register with said pockets, and means operable to turn said plate, with respect to said wheel, to successively aline said discharge opening with said pockets for release of gauge elements therefrom through said discharge opening.

10. Record playing apparatus as set forth in claim 8, including motor driven means operable upon delivery of a gauge element at said gauging station for adjusting the record selecting member to selecting position determined by a measurable characteristic of the gauge element at the gauging station.

11. Record reproducing apparatus as set forth in claim 8, including motor driven means operable upon delivery of a gauge element at said gauging station to adjust said record selecting member in accordance with a measurable characteristic of the gauge element at said gauging station, and means actuated in response to record movement at the conclusion of the record playing cycle for energizing said motor driven means for the restoration of the apparatus to stand-by condition ready for the performance of a repeat record playing cycle.

ARTHUR H. BUCKLEY.

REFERENCES CITED

The following references are of record in the file of this patent:

UNITED STATES PATENTS

| Number | Name | Date |
| --- | --- | --- |
| 1,081,361 | Brown | Dec. 16, 1913 |
| 1,735,335 | Owens | Nov. 12, 1929 |
| 2,071,952 | Scheibel | Feb. 23, 1937 |
| 2,167,459 | Long | July 25, 1939 |
| 2,221,097 | Roehl | Nov. 12, 1940 |
| 2,266,495 | Freborg et al. | Dec. 16, 1941 |
| 2,342,652 | Eakins | Feb. 29, 1944 |
| 2,392,856 | Martinec | Jan. 15, 1946 |
| 2,416,425 | Anderson | Feb. 25, 1947 |
| 2,439,406 | Martinec | Apr. 13, 1948 |